United States Patent [19]
Baram

[11] 3,840,121
[45] Oct. 8, 1974

[54] CENTRIFUGE WITH SEMI-PERMEABLE MEMBRANE, AND METHOD FOR ITS PREPARATION

[76] Inventor: Martin Baram, 2660 Brondby Strand, 13 Svanholmvej, Denmark

[22] Filed: Feb. 14, 1973

[21] Appl. No.: 332,387

[30] Foreign Application Priority Data
Feb. 23, 1972 Denmark .............................. 827/72

[52] U.S. Cl. .................................. 210/321, 117/95
[51] Int. Cl. ........................................... B01d 31/00
[58] Field of Search ......... 210/23, 380, 321; 117/95

[56] References Cited
UNITED STATES PATENTS
3,647,521  3/1972  Tulin ................................. 210/23 X
3,669,879  6/1972  Berriman ......................... 210/321 X Primary Examiner—Frank A. Spear, Jr.
Attorney, Agent, or Firm—Hubbell, Cohen & Stiefel

[57] ABSTRACT

Spirally coiled porous pipes with semi-permeable membrane lining are inserted in a rotatable vessel to subject solutions injected therein to centrifugally generated hydraulic pressure to perform reversed osmosis, dialysis or the creation of a membrane in situ.

6 Claims, 1 Drawing Figure

PATENTED OCT 8 1974  3,840,121
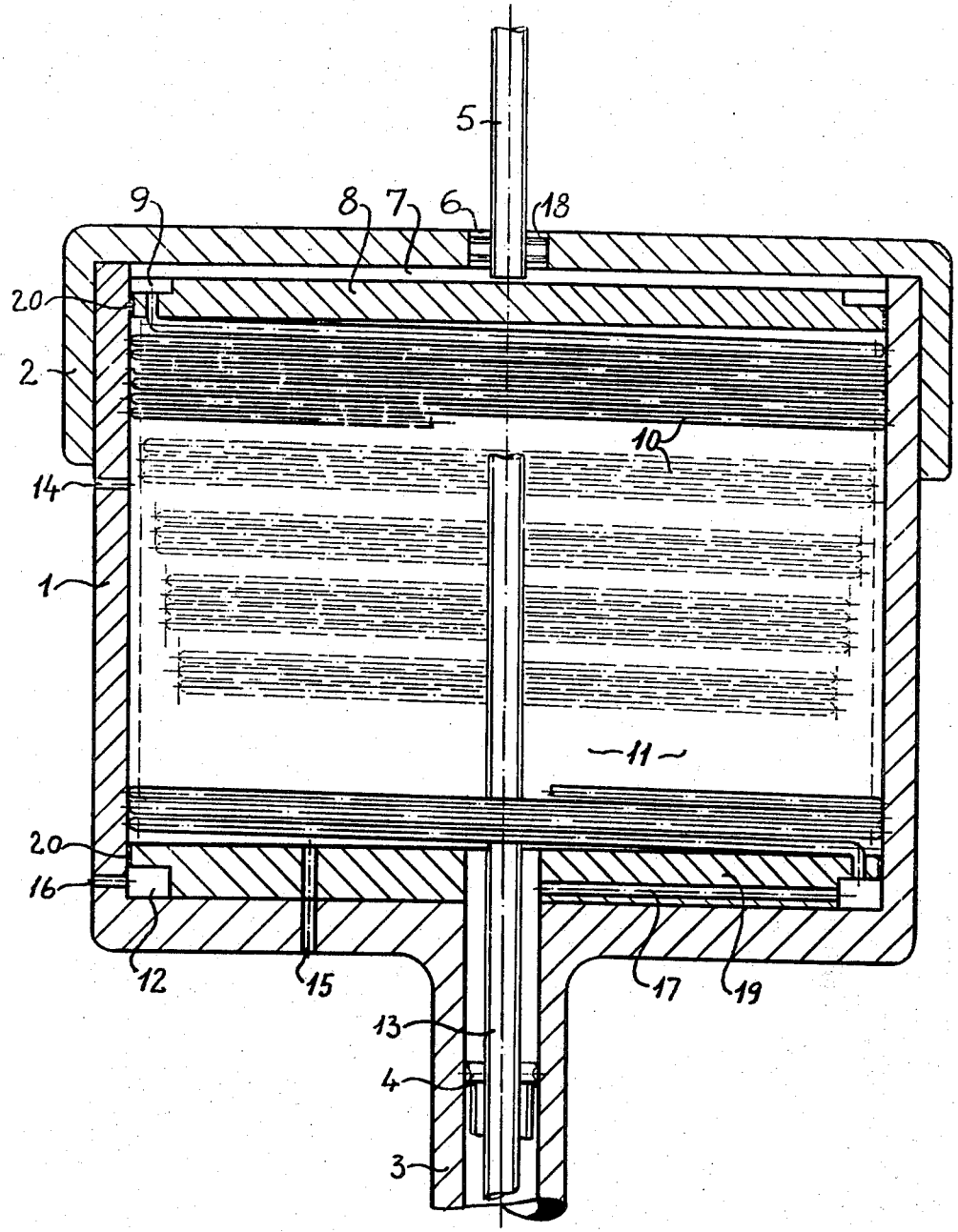

CENTRIFUGE WITH SEMI-PERMEABLE MEMBRANE, AND METHOD FOR ITS PREPARATION

The present invention relates to a centrifuge with semi-permeable membrane to be used for reversed-osmosis, ultra- or micro-filtration, and for dialysis.

In micro-filtration various kinds of semi-permeable membranes are used for example to separate homogeneous solutions such as extracting potable water from brackish or sea water, or water from alcohol-, cetone-, or acid-water mixtures, or extracting pure carbohydrates from cracking products, or separating water soluble components in milk.

In dialysis various semi-permeable membranes are used to transfer salts or small molecules from a solution also containing larger molecules on one side of the membrane to pure water on the other side of the membrane, which is penetrated in opposite directions at the same time without the application of outside energy owing to the chemically generated osmotic pressure difference between the two fluids divided by the semi-permeable membranes. Centrifugally induced forces of gravity may not accelerate the relatively slow diffundation but they may create favourable conditions of trans-membrane concentration by causing advantageous turbulences adjacent to the membrane surface in connection with centrifugally generated high frequency vibrations. Hitherto known apparatuses for dialysis consist generally of a number of narrow chambers defined by a corresponding number of membranes. Through the even numbered chambers may flow a solution with a certain colloidal concentration while through the odd numbered chambers may flow pure water or a much diluted solution. It is not known in the art to use centrifugal apparatus for dialysis processes.

In micro-filtration the semi-permeable membrane is penetrated in one direction only and against the osmotic gradient with the help of hydraulic pressure coming from outside sources of energy. In this case the centrifugally generated pressure and particle acceleration may be employed to great advantage to be varied by changing the rotation speed as well as to create turbulences and high frequency vibrations, and to vary the flow speed by moving the expulsion openings nearer or further relative to the axis of rotation. Turbulences, vibrations and high flow speed are necessary to the efficiency of the process and to prevent the polarization of concentrated solutes on or in the semi-permeable membrane.

Apparatus for micro-filtration known in the art are mostly stationary and the necessary hydraulic pressure comes from pumps. Here the need for on the one side high pressure and on the other side high flow rate are in fact contradictory, resulting in major difficulties which can only be resolved by expensive means.

Such apparatus consist for example of parallel long pressure pipes with inserted liners of porous material supporting a semi-permeable membrane, or of disc shaped vessels placed on top of each other and housing porous supports with semi-permeable membrane, or of a bundled bunch of semi-permeable capillary air-ducts placed inside a pressure vessel.

The drawbacks of such apparatus are among others that the long pipes-system is expensive and space consuming, that the disc-system is expensive and particularly hard to clean, both systems suffer from frequently ruptured membranes, that the air-ducts-system cannot be cleaned and has low efficiency, that high-pressure pumps are expensive to buy and to maintain and to run, and they may pollute the feed solution with eroded material and lubricating medium and may atomize valuable colloids in the solution, that the complicated pressure fittings and couplings needed to interconnect the pipes in modules make cleanliness and sterilization difficult if not impossible, and that the fluctuation pressures in the systems flatten and dislodge the semi-permeable membrane.

From the patent literature some centrifugal apparatus with semi-permeable membrane are known. From U.S. Pat. No. 3,400,074 it is known to use a centrifuge for the desalination of sea water by micro-filtration. This centrifuge is characterized by a rotating cylindrical porous support for a semi-permeable membrane lining. In operation sea water is injected onto the semi-permeable membrane surface. Fresh water penetrates the membrane and its support and is flung away from the outer surface of the cylinder into a stationary water collector while the concentrated sea water is also flung away into another collector. This centrifuge is not much more than an ordinary filter centrifuge where the filter cloth has been replaced by a semi-permeable membrane, and has such decisive drawbacks that it cannot be used in practice.

Firstly and mainly the obtainable semi-permeable membrane surface area is extremely limited which rules this invention out for practical purposes as the available membrane surface area determines the productiveness of the process, and secondly the cited patent contains no indication as to how the semi-permeable membrane is to be inserted into, secured in, and taken out of the rather indistinctly sketched centrifuge, a problem that cannot be solved by adapting techniques known from stationary apparatus.

From West-German Pat. No. 2,007,474 another centrifuge is known to include a porous support with semi-permeable membrane-lining which may have conical shape or pleatings or be arranged in a spirally wound "sandwich." Also here both the permeate and the concentrate are flung away from the rotating centrifuge. Also here the available surface area is inefficiently limited, and also here no indication is given as to how the membranes are inserted, secured or taken out suitably. Neither of the known centrifuges permits the handling of solutions which have to be sealed off hermetically from the outer atmosphere, is able to work in conjunction with two simultaneously injected fluids, and is conceived to have the semi-permeable membrane created in situ while the centrifuge is rotating.

Keeping in mind that micro-filtration mainly is employed:

a. to purify an admixture by removing relatively small solutes, b. to concentrate a solution by removing certain solvents, c. to separate one solute from another, especially in biologically active and other heat-, or oxidation-, or contamination- sensitive material, and d. to analyze complex solutions by employing membranes with different characteristics, the drawbacks with the known centrifuges are:

1. that the concentrate solution which may be very valuable and unstable is expelled forcibly and thus atomized by impact against the stationary collectors, thereby in addition being mixed intensively with air and air borne contaminations,
2. that they give no useful constructive indication necessary to implement the inventions as to how the various elements of the centrifuge are made and act together,
3. that they do not provide means for a "counter"-penetration of the porous supports and the semi-permeable membrane which is necessary to create semi-permeable membranes in situ or to conduct a dialysis process, or to introduce vapors or steam to engage certain solutions or permeates.

Thus, it is the object of the present invention to provide a novel centrifuge and a novel method for the purposes indicated mainly under (a) – (d) without the drawbacks mentioned under (1) – (3).

This is achieved by a centrifuge in accordance with the present invention. Compared with the known centrifuges and the stationary apparatus the present invention offers a very extensive membrane-surface area in a limited space and a relatively low energy consumption per material yield as well as low manufacturing and maintenance costs.

EXAMPLE

A rotor with inner dia. = 1,000 mm and internal height = 700 mm, may contain six independently acting spirally wound porous pipes with outer dia. = 10 mm, and inner dia. = 8 mm having a combined semi-permeable membrane-surface area of ca. 30 m². Known membrane types for the desalination of sea water produce ca. 280 liters potable water in 24 hours for every m² of membrane surface, needing a pressure of ca. 80 kp/cm². Said rotor can thus produce ca. 8,400 liters potable water in 24 hours with a calculated driving power of max. 12 hp. For the sake of illustration it may be mentioned that said rotor at 3,000 rpm generates a median peripheral pressure in salt water of more than 120 kp/cm². The centrifuge may include constructional features for processes where the feed solution may not come in contact with air or air borne contaminations, and constructional features where the concentrate may not be expelled forcibly from the rotor. As shown and preferred, the centrifuge may include an advantageous rotor type with regard to manufacturing cost, stress resistance, balancing, air friction and exchange of membrane units.

The manner of preparing the centrifuge for use shall also be described herein. By injecting the fluid semi-permeable membrane raw material of known composition into the rotating centrifuge the porous pipes will be lined with a homogeneous and equal layer thickness. If this is done at a higher rotational speed than normally employed in the separating process the semi-permeable membrane will be able to withstand the lower working stresses in contrast to the known apparatuses where the semi-permeable membrane is made at zero pressure and expected to work at considerably higher working stresses. The special features of the present invention permit the normal curing and after treatment of the new semi-permeable membrane to be carried out in situ.

The invention is described in further details in conjunction with the accompanying drawing which, by way of example, shows a cylindrical rotor 1 with a removable cover 2 and a supporting hollow shaft 3 enclosing a paring disc 4. Rotor 1 is supported and driven by known, not shown means. A normally stationary pipe 5 enters through an opening 6 in an acceleration chamber 7. A dividing plate 8 is furnished with an open annular channel 9 which is connected with the open ends of, in this case, five porous spirally extending pipes 10, which occupy coaxially and in mutual concentrical arrangement an internal rotor chamber 11, and whose opposite open ends are connected to an annular expelling chamber 12. The internal rotor chamber 11 is also in connection with a normally stationary pipe 13 which also may be inserted through opening 6 inside and concentric with pipe 5 penetrating plate 8 in a suitable manner. In that case shaft 3 may be solid and paring disc 4 is eliminated. Rotor chamber 11 is connected to the outer atmosphere either through radial channels 14 or through parallaxial channels 15 which may be placed at different distances from the axis of rotation. Expelling chamber 12 is connected to the outer atmosphere through peripheral channels 16 or to the hollow shaft 3 through channels 17. In a micro-filtration-process the permeate leaves the rotor chamber 11 through channels 14. In a dialysis-process channels 15 are used to expell water or a diluted solution which has acted through the porous pipes and the semi-permeable membrane-lining against a concentrate flowing inside the pipes. Opening 6 may be sealed with a gasket 18 against pipe 5. The hollow shaft 3 may contain gaskets to seal against pipe 13. The disc 8, pipes 10 and a lower dividing disc 19 may be forming one unit which can be inserted in the rotor 1 without special tightening means but some elastic gaskets 20 which press against the rotor's inner surface. In order to create special turbulences it is possible to insert not shown obstacles in pipes 10. In order to create high-frequency vibrations in the fluids or membranes the rotor or the stationary pipes may be connected to suitable generators.

I claim:

1. A multipurpose rotating centrifuge for reversed osmosis, micro-filtration and for dialysis comprising a hollow housing, a hollow cylindrical rotor means mounted in said housing for rotation therein, said rotor means having a first chamber having at least one spirally wound first porous pipe means within said first chamber, said first porous pipe means having a semi-permeable membrane lining fur the interior thereof, said first porous pipe means having an inlet opening at one end thereof and an outlet opening at the opposite end thereof, said rotor means further comprising a second acceleration chamber isolated from said first chamber and having an opening therein in flow through communication with said first porous pipe means inlet end, a second supply pipe means having one end opening into said second accelleration chamber for introducing a first unpressurized fluid thereto, said first fluid being supplied to said first porous pipe means inlet through said second accelleration chamber opening, said first chamber having a first radial channel therein opening to the outside for expelling permeate therefrom during micro-filtration and a second parallaxial channel therein at the bottom of said first chamber for expelling fluid which has acted through said first porous pipe means during dialysis, said rotor means further comprising a third expelling chamber isolated from said first chamber and in flow through communication with said first porous pipe means outlet end, said third expelling chamber having outlet means opening to the outside for expelling concentrate of said first fluid therefrom, and a third supply pipe means opening into said first chamber for supplying a second fluid thereto, whereby an enhanced semi-permeable membrane surface area is provided for the interior of said first chamber.

2. A centrifuge in accordance with claim 1, characterized in that the opening for the first supply pipe is furnished with sealing means to close hermetically the acceleration chamber.

3. A rotating centrifuge in accordance with claim 1 further comprising a plurality of said spirally wound semi-permeable membrane lined porous pipe means, each of said porous pipe means acting independently of the others and being concentrically coaxially disposed one above the other in said first chamber, each of said porous pipe means inlet ends being in flow through communication with said second acceleration chamber and each of said porous pipe means outlet ends being in flow through communication with said third expelling chamber.

4. A rotating centrifuge in accordance with claim 1 wherein said rotor means rotates on a hollow shaft means, said third expelling chamber being in flow through communication with the exterior of said housing and the interior of said hollow shaft means.

5. A centrifuge in accordance with claim 4, characterized in that the hollow shaft is furnished with paring organs for the controlled removal of said concentrate or any other pertinent fluids.

6. A method of providing a fitting semi-permeable membrane lining within a multipurpose rotatable centrifuge comprising the steps of providing a rotatable centrifuge having a hollow housing a hollow cylindrical rotor means mounted in said housing for rotation therein, said rotor means having a first chamber having at least one spirally wound first porous pipe means within said first chamber said first porous pipe means having a semi-permeable membrane lining for the interior thereof, said first porous pipe means having an inlet opening at one end thereof and an outlet opening at the opposite end thereof, said rotor means further comprising a second acceleration chamber isolated from said first chamber and having an opening therein in flow through communication with said first porous pipe means inlet end, a second supply pipe means having one end opening into said second acceleration chamber for introducing a first unpressurized fluid thereto, said first fluid being supplied to said first porous pipe means inlet through said second acceleration chamber opening, said first chamber having a first radial channel therein opening to the outside and a second parallaxial channel therein at the bottom of said first chamber for expelling fluid which has acted through said first porous pipe means, said rotor means further comprising a third expelling chamber isolated from said first chamber and in flow through communication with said first porous pipe means outlet end, said third expelling chamber having outlet means opening to the outside for expelling concentrate of said first fluid therefrom, and a third supply pipe means opening into said first chamber for supplying a second fluid thereto; and injecting unpressurized fluid semi-permeable membrane forming raw material and curing fluid into said unlined first spiral porous pipe means and said first rotor chamber through said supply pipes by rotational movement of said centrifuge.

* * * * *